United States Patent
Fischer et al.

(10) Patent No.: US 7,454,625 B2
(45) Date of Patent: *Nov. 18, 2008

(54) METHOD AND APPARATUS FOR PROTECTING A CALCULATION IN A CRYPTOGRAPHIC ALGORITHM

(75) Inventors: Wieland Fischer, Munich (DE); Jean-Pierre Seifert, Munich (DE)

(73) Assignee: Infineon Technologies AG, Neubiberg (DE)

( * ) Notice: Subject to any disclaimer, the term of this patent is extended or adjusted under 35 U.S.C. 154(b) by 706 days.

This patent is subject to a terminal disclaimer.

(21) Appl. No.: 10/827,913

(22) Filed: Apr. 19, 2004

(65) Prior Publication Data

US 2005/0005147 A1 Jan. 6, 2005

Related U.S. Application Data

(63) Continuation of application No. PCT/EP02/11523, filed on Oct. 15, 2002.

(30) Foreign Application Priority Data

Oct. 17, 2001 (DE) .............................. 101 51 139
Dec. 19, 2001 (DE) .............................. 101 62 496

(51) Int. Cl.
G06F 11/30 (2006.01)
G06F 12/14 (2006.01)
H04L 9/32 (2006.01)
G06F 11/00 (2006.01)

(52) U.S. Cl. ........................ 713/189; 380/1; 714/100
(58) Field of Classification Search .................. None
See application file for complete search history.

(56) References Cited

U.S. PATENT DOCUMENTS 5,631,960 A * 5/1997 Likens et al. .................. 380/2

(Continued)

FOREIGN PATENT DOCUMENTS

DE 42 34 165 C1 3/1994

(Continued)

OTHER PUBLICATIONS

Bong D et al.: "Optimized Software Implementations of the Molecular Exponentiation on General Purpose Microprocessors"; Computers & Security, International Journal Devoted to the Study of Technical and Financial Aspects of Computer Security, Elsevier Science Publishers, Amsterdam, NL., vol. 8, No. 7, Nov. 1, 1989, pp. 621-630.

(Continued)

*Primary Examiner*—Christian LaForgia
(74) *Attorney, Agent, or Firm*—Dickstein Shapiro LLP

(57) ABSTRACT

In a method for protecting a calculation in a cryptographic algorithm, the calculation obtaining input data so as to create output data, input data for the calculation are initially provided. Subsequently, the calculation is performed so as to obtain the output data of the calculation. After the calculation has been performed, a verification is carried out as to whether the input data was changed during the calculation, to be precise using a verification algorithm which differs from the calculation itself. If the verification proves that the input data was changed during the calculation, forwarding of the output data is suppressed. By doing so, outputting of incorrect results of the calculation of the cryptographic algorithm is prevented with a high degree of certainty, since the input data is particularly susceptible to hardware attacks. In addition, the input data may be examined with a view to their integrity with little expenditure compare to calculating the cryptographic algorithm itself.

13 Claims, 5 Drawing Sheets

U.S. PATENT DOCUMENTS

| | | | | |
|---|---|---|---|---|
| 5,991,415 | A | * | 11/1999 | Shamir ................... 380/30 |
| 6,092,229 | A | | 7/2000 | Boyle et al. |
| 6,144,740 | A | * | 11/2000 | Laih et al. ................ 380/2 |
| 6,282,290 | B1 | | 8/2001 | Powell et al. |
| 6,934,887 | B1 | | 8/2005 | Baldischweiler et al. |
| 6,965,673 | B1 | * | 11/2005 | Boneh et al. ............ 380/28 |
| 6,986,050 | B2 | * | 1/2006 | Hypponen ............. 713/183 |

FOREIGN PATENT DOCUMENTS

| | | |
|---|---|---|
| DE | 197 25 167 A1 | 12/1998 |
| DE | 199 44 991 A1 | 4/2001 |
| DE | 199 61 838 A1 | 7/2001 |
| DE | 100 24 325 A1 | 12/2001 |
| EP | 0 621 569 B1 | 10/1994 |
| EP | 0 743 774 A2 | 11/1996 |
| EP | 0 872 795 A1 | 10/1998 |

OTHER PUBLICATIONS

Chung-Hsien Wu et al.: "RSA Cryptosystem Design Based on the Chinese Remainder Theorem"; Design Automation Conference 2001, Proceedings of the ASP-DAC 2001 Asia and South Pacific, Jan. 30, 2001-Feb. 2, 2001, pp. 391-395.

Comba P G: "Exponentiation cryptosystems on the IBM PC"; IBM Systems Journal, IBM Corp. Armonk, NY, US, vol. 29, No. 4, 1990, pp. 526-538.

Shand M et al.: "Fast Implementations of RSA Cryptography"; Proceedings of the Symposium on Computer Arithmetic, Windsor, Ontario, Jun. 29-Jul. 2, 1993, Los Alamitos, CA, US, IEEE Computer Society Press, vo.. SYMP. 11, Jun. 29, 1993, pp. 252-259.

Grossschaedl J.: "High-Speed RSA Hardware Based on Barret's Modular Reduction Method"; Cryptographic Hardware and Embedded Systems, 2nd International Workshop, CHES 2000, Worchester, MA, Aug. 17-18, 2000 Proceedings, Lecture Notes in Computer Science, Berlin: Springer, Germany, vol. 1965, Aug. 17, 2000, pp. 191-203.

Quisquater J. et al.: "Fast Decipherment Algorithm for RSA Public-Ken Cryptosystem"; Electronics Letters, Oct. 14, 1982, vol. 18, No. 21, pp. 905-907.

Schindler, Werner, "A Timing Attack against RSA with the Chinese Remainder Theorem", CHES 2000, LNCS 1965, pp. 109-124.

Grossschadl, Johann, "The Chinese Remainder Theorem and its Application in a High-Speed RSA Crypto Chip", IEEE 2000, pp. 384-393.

Schnorr, Claus P., "Efficient Identification and Signatures for Smart Cards", Springer-Verlage, 1998, pp. 239-252.

Boneh, Dan, et al., "On the Importance of Eliminating Errors in Cryptographic Computations", Journal of Cryptology, 2001, vol. 14, pp. 101-119.

Rankl et al., "Handbuch der Chipkarten", vol. 3, Hanser Verlag, pp. 506-509 (w/English translation of relevant portion).

Bao, F., et al., "Breaking Public Key Cryptosystems on Tamper Resistant Devices in the Presence of Transient Faults", Security Protocol Workshop '97, http://www.ens.fr/~vaudenay/spw97/.

Boneh, Dan, et al., "On the Importance of Checking Cryptographic Protocols for Faults", Advances in Cryptology, proceedings of the EUROCRYPT '97, pp. 37-51.

Klima, Vlastimil, et al., "Attack on Private Signature Keys of the OpenPGP format, PGP TM programs and other applications compatible with OpenPGP", Mar. 22, 2001, pp. 1-20.

Rankl, Wolfgang, et al., "Handbuch der Chipkarten", 1999, pp. pp. 138-139.

Springer-Verlag, 1998, pp. 43-35.

Menezes et al.: "RSA public-key encryption"; Handbook of Applied Cryptography; CRC Press 1996, capital 8.2, pp. 285-291.

\* cited by examiner

METHOD AND APPARATUS FOR PROTECTING A CALCULATION IN A CRYPTOGRAPHIC ALGORITHM

CROSS-REFERENCE TO RELATED APPLICATION

This application is a continuation of co-pending International Application No. PCT/EP02/11523, filed Oct. 15, 2002, which designated the United States and was not published in English.

BACKGROUND OF THE INVENTION

1. Field of the Invention

The present invention relates to cryptography and, in particular, to a method and an apparatus for protecting a calculation in a cryptographic algorithm.

2. Description of the Related Art

Modular exponentiation is one of the core calculations for various cryptographic algorithms. One example of a widespread cryptographic algorithm is the RSA cryptosystem described, for example, in "Handbook of Applied Cryptography", Menezes, van Oorschot, Vanstone, CRC Press, 1996, chapter 8.2. The RSA cryptosystem operates as follows. In the encryption, a party B encrypts a message m for another party A. Only party A is supposed to decrypt the encrypted message received from B. Initially party B receives the public key from party A. Then party B represents the message to be encrypted as an integer m. Then party B encrypts the message m as follows:

$$c = m^e \bmod n \qquad (1)$$

In the equation (1), m represents the plain-text message. e is the public key. n is the module and is also public. c represents the encrypted message.

Party B now sends the encrypted message c to party A.

For decryption, i.e. to recover the plain-text m from the secret text c, A performs the following calculation:

$$m = c^d \bmod n \qquad (2)$$

In the equation (2), d represents the private key of party A which is to be protected against attacks.

An RSA signature algorithm is also known in the art. This involves the following procedure. Each entity A initially creates two large prime numbers p and q and then calculates the module n from the product of p and q. As has also been described in chapter 11.3 in the above-mentioned specialist book, a key is generated therefrom, so that each party has a public key comprised of n, i.e. the module, and e, whereas each party additionally has a private key d.

For RSA signature generation and verification, entity A signs a message m. Each entity B is to be able to verify A's signature and to retrieve the message m from the signature.

In the signature generation, entity A initially calculates an integer m'=R(m). Thereafter, entity A conducts the following calculation:

$$s = m'^d \bmod n \qquad (3)$$

wherein s is A's signature for the message m.

To verify the party A's signature and for retrieving the message m, party B must proceed as follows:

First of all, party B must obtain the public key (n, e) from A. Then party B conducts the following calculation:

$$m' = s^e \bmod n \qquad (4)$$

In the equation (4) e is A's public key.

Party B will then verify whether m' is the element from a space $M_R$. If this is not the case, the signature will be rejected. If this is the case, the message m will be retrieved by calculating $m = R^{-1}(m')$.

It becomes evident from the above representation that modular exponentiation is required in a variety of places. In particular for RSA encryption in equation (2) and for RSA signature generation in equation (3), the secret key d is used for calculation.

Since the secret key—just like the public key—may take on considerable lengths, such as 1024 or 2048 bits, in typical RSA systems, modular exponentiation is a relatively extensive calculation, in particular for low power devices such as smart cards, mobile phones or PDAs.

To be able to calculate modular exponentiation more rapidly, it is known to employ the so-called Chinese remainder theorem (CRT) described in paragraph 2.120 of the above-designated specialist book. For RSA systems the Garner algorithm, which is also described in the above-described specialist book, chapter 14.5.2, is especially preferred. The classic algorithm for the CRT typically requires a modular reduction with the module M, while this is not the case with the Garner algorithm. Instead, a "large" modular exponentiation is divided into two "small" modular exponentiations in the latter algorithm, the results of which are then united in accordance with the Chinese remainder theorem. Even though two exponentiations are required here, it is still better to calculate two "small" modular exponentiations than one "large" modular exponentiation.

For representing the RSA-CRT method using the Garner algorithm, reference is made to FIG. 5. In a block 100 the input parameters are set forth which all depend only on p and q as well as on key d, but not on the message m to be signed, for example. In a block 102, the output of the algorithm is represented as has been represented by means of equation (2) or equation (3). It shall be pointed out that the method described in FIG. 5 is not used only for a calculation with secret keys, but, of course, also for a modular exponentiation using the public key.

A first modular auxiliary exponentiation (sp) is then calculated, in a block 104, from the input quantitys represented in block 100. By analogy therewith, a second modular auxiliary exponentiation (sq) is calculated in a block 106. The results of the first and second modular auxiliary exponentiations are then joined in accordance with the Chinese remainder theorem in a block 108 to obtain the result $s = m^d \bmod n$. Generally, the RSA-CRT method represented in FIG. 5 is about four times faster than direct calculation of the output represented in block 102, for example by means of the square-and-multiply algorithm.

Due to the efficiency of calculation, the RSA-CRT algorithm represented in FIG. 5 is in any case preferable to the square-and-multiply algorithm. However, the RSA-CRT algorithm has the disadvantage that it is very susceptible to cryptographic "attacks" in that the secret key d may be determined if an erroneous calculation of the RSA-CRT algorithm is evaluated accordingly. This fact has been described in "On the Importance of Eliminating Errors in Cryptographic Computations", Boneh, De-Millo, Lipton, J. Cryptology (2001) 14, pp. 101 to 119. The document elaborates on the fact that in one implementation of the RSA method based on the Chinese remainder theorem (CRT), the secret signature key may be determined from a single erroneous RSA signature.

An erroneous RSA signature may be obtained by causing the software or hardware executing the algorithm to make errors, for example by exposing the crypto-processor to an electrical or thermal load.

As countermeasures against such attacks based on hardware errors it has been proposed to verify the output of each calculation before same is output from the chip. Even though this additional verification step may downgrade the system behavior, mention is made that this additional verification is essential for security reasons.

The simplest manner of verification is to perform a counter-calculation with the public exponent e, the intention being to determine the following identity:

$$(m^d)^e = m \bmod n \quad (5)$$

However, this additional verification step is directly comparable to the actual signature and/or decryption step in terms of computing expenditure and therefore leads to a halving of the system behavior, but provides a large amount of security.

However, another advantage is that the public key e is not available in common protocols, such as ZKA-lib, for example. ZKA-lip is a collection of specifications of the central credit committee governing which data is available. For the RSA-CRT method, only the input data given in block 100 of FIG. 5 is available. Here, the public key e is not part of the parameters preset in the ZKA-lib description. The exponent e would therefore have to be calculated with a lot of expenditure so as to be able to perform the "counter-calculation" in accordance with equation (5). This would further reduce the performance of the signature chip card and is likely to lead to the effect that such algorithms stand no chance of catching on in the market due to their slow mode of operation.

A further method for verifying signatures created by RSA-CRT methods is described in the specialist publication by A. Shamir, "How to check modular Exponentiation", Rump Session, Eurocrypt 97. This specialist publication suggests using a small random number r (for example, 32 bits) and to perform the following calculation instead of the calculation in block 104:

$$sp' = m^d \bmod pr \quad (6)$$

The following calculation is performed instead of block 106:

$$sp' = m^d \bmod qr \quad (7)$$

Subsequently, immediately after the calculations in accordance with the equations (6) and (7), the following verification calculations are performed:

$$sp' \bmod r = sq' \bmod r \quad (8)$$

If the verification in accordance with equation (8) is true, sp and sq are obtained from the following equation (9):

$$sp' \bmod p = sp; \, sq' \bmod q = sq \quad (9)$$

From the values sp and sq obtained through equation (9), the calculation represented in block 108 in FIG. 5 is then performed so as to put combine the total result s by means of the Chinese remainder theorem from the modular auxiliary exponentiations.

This method has the disadvantage that only the auxiliary parameter r and the intermediate results sp' and sq' are used for verification, the verification not leading to the suppression of an output value if a cryptographic attack has taken place which possibly has not affected the intermediate results sp', sq' or the parameter r, but subsequently leading to a hardware error, for example in the steps given in equation (9) and in the final combining of the algorithm, which hardware error may be used to spy out the secret key d without permission.

In addition, the cited specialist publication by Boneh et al. proposes, for example as a countermeasure for protecting the Fiat-Shamir scheme, warding off any occurring register errors, while the processor is waiting for an external response, by employing error detection bits for protecting the internal memory of a processor. Further measures to protect RSA signatures are to introduce a randomness into the signature method. The randomness ensures that the signer never signs the same message twice. In addition, if the verifier is presented with an erroneous signature, it does not know the complete plain-text that has been signed.

SUMMARY OF THE INVENTION

It is the object of the present invention to provide a secure and efficient concept for protecting a calculation in a cryptographic algorithm.

In accordance with a first aspect, the present invention provides a method for protecting a calculation in a cryptographic algorithm, the calculation obtaining input data to produce output data, the method having the steps of: providing the input data for the calculation; performing the calculation to obtain the output data of the calculation; after the performance of the calculation, verifying whether the input data was changed during the calculation by using a verification algorithm which differs from the calculation; and if the verification proves that the input data were changed during the calculation, suppressing a forwarding of the output data of the calculation.

In accordance with a second aspect, the present invention provides an apparatus for protecting a calculation in a cryptographic algorithm, the calculation obtaining input data to produce output data, the apparatus having: means for providing the input data for the calculation; means for performing the calculation to obtain the output data of the calculation; means for verifying whether the input data was changed during the calculation, using a verification algorithm which differs from the calculation, the means for verifying being designed to perform the verification after the calculation has been performed; and means for suppressing any forwarding of the output data if the means for verifying determine that the input data was changed during the calculation.

The present invention is based on the findings that the data input into a cryptographic calculation, such as, for example, the data represented in block 100 of FIG. 5, is most likely to become a "victim" of a cryptographic attack. Investigations have shown that cryptographic attacks can be detected by the fact that input data for a calculation in a cryptographic algorithm are most likely to be affected by a hostile attack, while this does not apply to an equally significant degree to results of the cryptographic calculation. It has been found that the input data is an indicator for a cryptographic attack, as it were. If the input data is unchanged, after a calculation has been performed in a cryptographic algorithm, compared to their state before the cryptographic algorithm was performed, it can be fairly safely assumed that no cryptographic attack has taken place. If it is found, however, after performing a calculation for a cryptographic algorithm, that the input data has changed as compared to its original state, it can be safely assumed that a cryptographic attack has taken place.

In the inventive method for protecting a calculation in a cryptographic algorithm, the input data for the cryptographic calculation is therefore initially provided. Subsequently, the calculation is performed so as to obtain the output data of the calculation. After the calculation has been performed a verification is carried out as to whether the input data was changed during the calculation, to be precise using a verification algorithm which differs from the calculation itself. If the verification proves that the input data was changed during the calculation, any forwarding of the output data of the calculation is suppressed.

One advantage of the present invention is that the inventive concept may dispense with the use of intermediate results, i.e., for example, the output data of the calculation. Since the input data is a safe indicator of whether an attack has taken place, a verification is carried out, in accordance with the invention, prior to forwarding any output data of the calculation either to an output or to a subsequent calculation, whether the input data was changed during the calculation. The input data is therefore used as a "sensor" for a cryptographic attack.

One advantage of the present invention is that a verification algorithm may be employed which may be considerably less expensive than the cryptographic calculation itself, so that the expense required by "counter-calculating" with the public exponent is avoided.

A further advantage of the present invention is that cryptographic attacks are detected more safely than with the known concept, wherein output data of the auxiliary exponentiations are required to perform a verification. Concepts requiring intermediate results of a calculation will generally only be able to determine whether an error has occurred during the calculation of the intermediate results, i.e. whether the internal calculating unit of the processor has operated incorrectly due to an error attack.

If the cryptographic attack, however, has been so "weak" that only the memory but not the calculating unit is affected, a verification based on intermediate results will make out this error. However, as soon as the calculating unit accesses the —now faulty—memory at a later date to poll parameters for a subsequent calculation, an error will occur which an attacker can take advantage of. Such an access operation would take place, for example, when the calculating unit in block 108 accesses the memory to poll qinv, p or q. The known protection measure has no more functionality to catch such an error.

There are various possibilities of verifying the input data after the cryptographic calculation has been performed. One possibility is to form a checksum when storing the input data and to store this checksum as well. After the cryptographic calculation has been executed, the same memory location is accessed so as to retrieve its contents and to form a checksum with the contents of the memory location at which the input data should be located. If the checksum corresponds to the checksum stored, the result of the calculation may be output. If the checksum formed on the basis of the input data memory contents does not correspond to the checksum stored in the memory, it can be assumed that a cryptographic attack has taken place, which is why no data is output, but instead an error message or nothing at all.

A further preferred alternative for verifying the input data is to process the input data, by means of a processing algorithm, either during the storing of the input data on the chip card itself or at the beginning of a calculation, so as to determine security information which may be stored at a security information memory location. After the cryptographic algorithm has been executed, the contents of the security information memory location may be retrieved and processed in accordance with a check algorithm. The check algorithm is designed such that a predetermined result is obtained if the contents of the security information memory location are not changed. If this result is obtained, it can be assumed that no attack has taken place. However, if this result is not obtained, it is likely that an attack has taken place, and therefore the output data of the calculation of the cryptographic algorithm must be suppressed.

A suitable processing algorithm is, for example, to multiply a number with an integer. The check algorithm corresponding to this processing algorithm is to perform a modular reduction of the security information with the original figure. A "0" is then expected as the predetermined result. Of course, further check algorithms are conceivable which all are characterized by the property that they provide a predetermined result after the security information derived from the input data has been processed, to be precise before the calculation has been executed.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

The inventive apparatus for protecting a calculation in a cryptographic algorithm initially includes means 10 for providing input data for the calculation which is part of a cryptographic algorithm, such as, for example, of an RSA algorithm for encryption/decryption or signature/verification purposes. The providing means 10 supplies input data for the calculation, the input data being fed to means 12 for performing the cryptographic calculation, or the calculation for a cryptographic algorithm. The means 12 supply output data of the calculation. For security reasons the output data of the calculation are now no longer simply output or supplied to a further calculation, for example, but are delayed for such time until means 14 for verifying a change in the input data have established whether or not a cryptographic attack has taken place.

The means 14 carry out this verification using the input data. If the state of the input data prior to the execution of the cryptographic calculation has not changed at all as compared to after the execution of the cryptographic calculation, it is assumed that no attack has taken place, so that the output data at the output of the means 12 may be output, for example, to a display or may be supplied to a further calculation as input data. If the means 14, however, establish that the input data has changed, means 16 are activated so as to suppress the output data. Depending on the implementation, an error message may be output in addition to suppressing the output data. Alternatively, it is also possible that no output takes place.

Figure 2A:
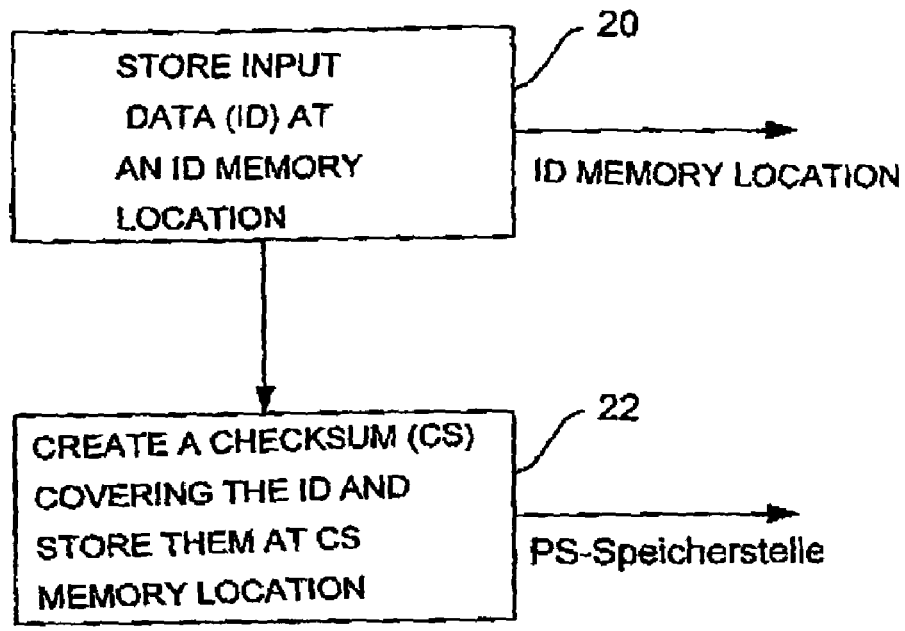
FIGS. 2a and 2b show a more detailed representation of the inventive concept with a checksum algorithm in accordance with a first embodiment of the present invention.
Figure 2B:
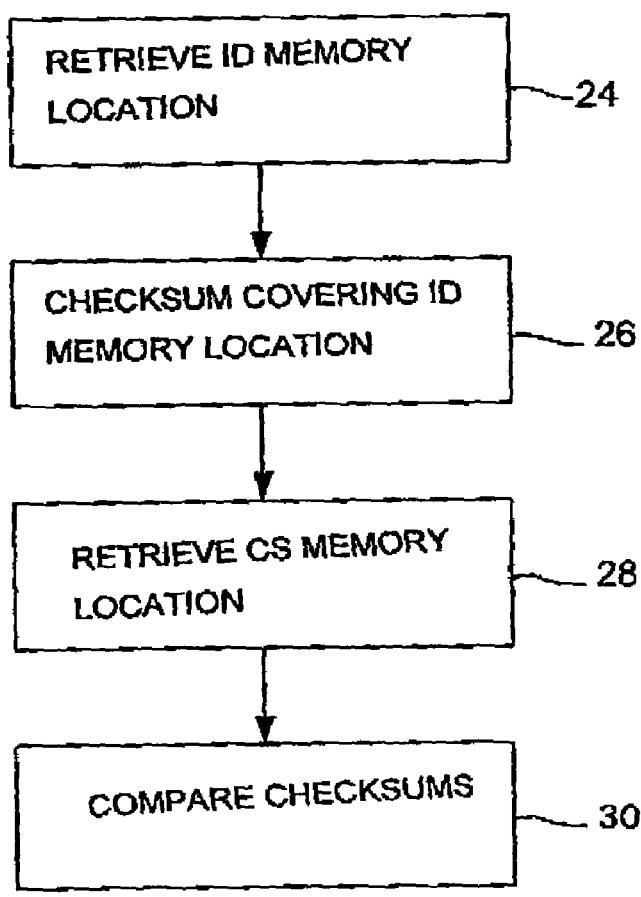
Figure 5:
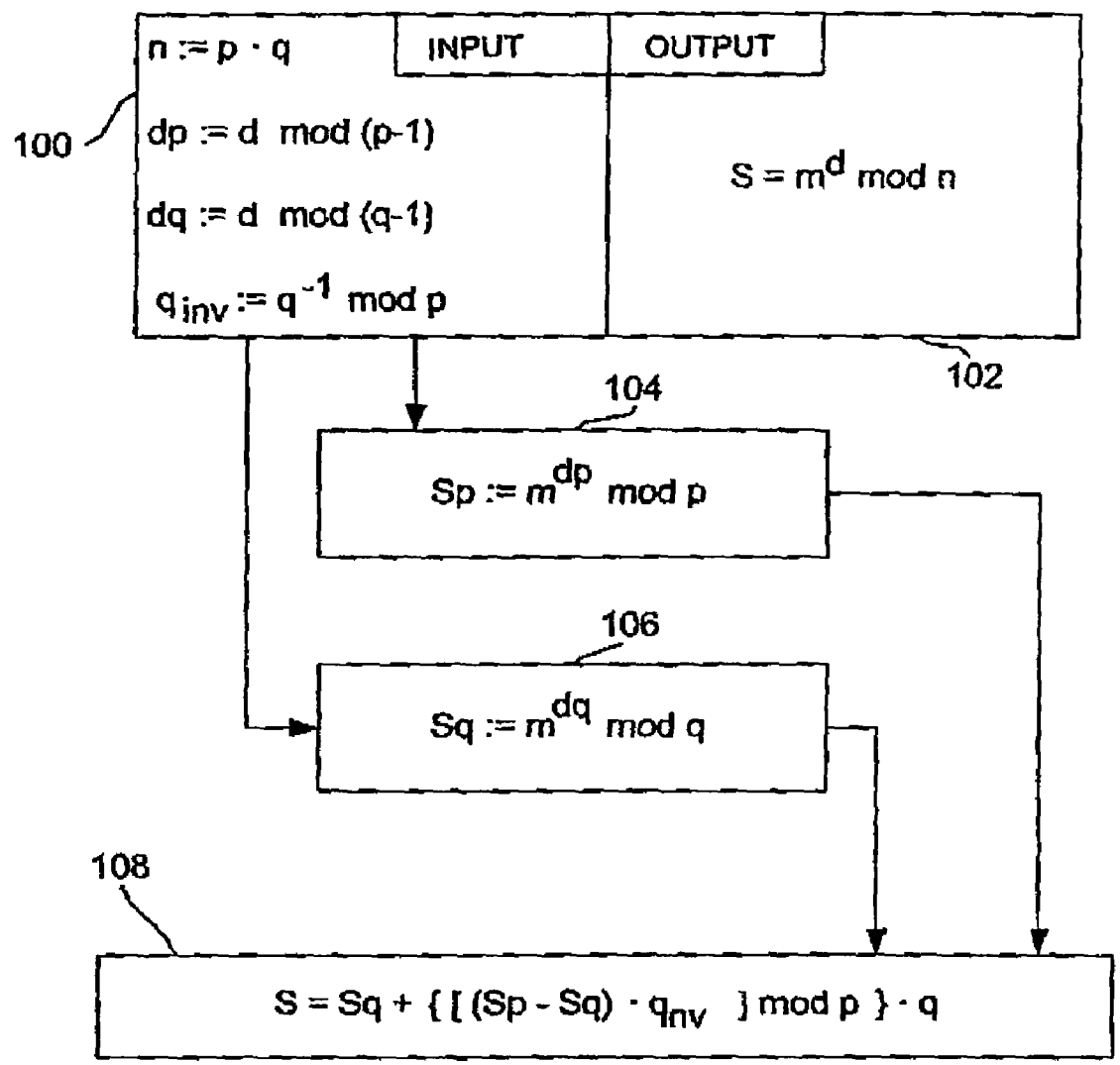
FIG. 5 shows a block diagram of the known RSA-CRT method.

FIGS. 2a and 2b show a more detailed representation of a first embodiment of the present invention based on a checksum algorithm. In a block 20, input data for a calculation of a cryptographic algorithm, such as, for example, the RSA-CRT calculation represented in FIG. 5, is initially stored at an input data memory location of a cryptography processor. Subsequently, for example as early as during the first storing of the data on the card, a checksum, for example a CRT checksum, is formed on the input data, whereupon the checksum is stored at a checksum memory location of the cryptography processor (block 22).

Figure 1:
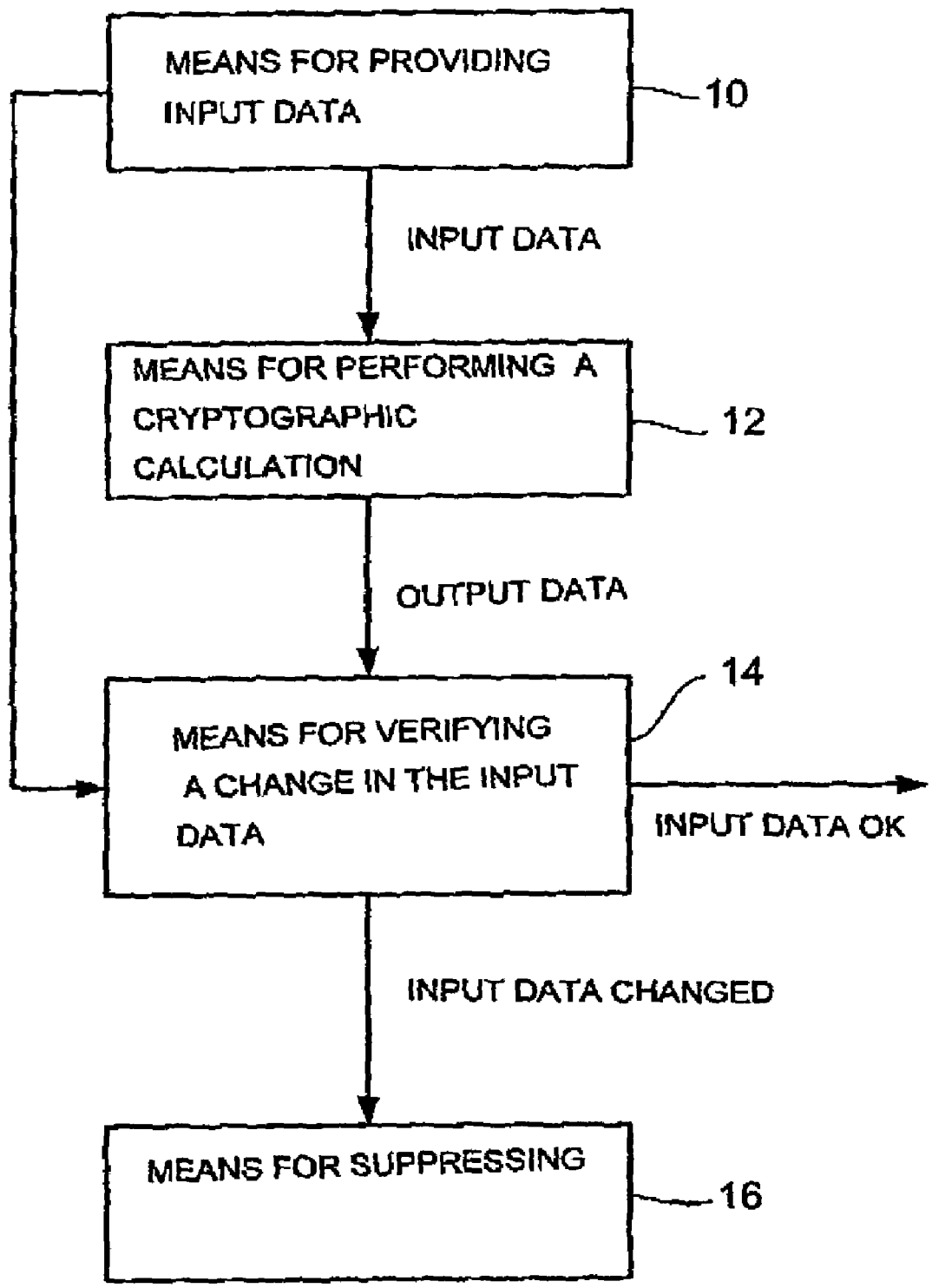
FIG. 1 shows a block diagram of the inventive concept.

As is shown in FIG. 2b, the means 14 of FIG. 1 will then be designed so as to access the input data memory location, after the cryptographic algorithm has been calculated, to retrieve the contents of the input data memory location (block 24). As is represented by a block 26, a checksum on the retrieved contents of the input data memory location will then be formed, use being made of the same algorithm as in block 22. At the output of block 26, there is thus a currently calculated input data checksum. By means of a block 28, the checksum stored at the checksum memory location by means of block 22 (FIG. 2a) is accessed thereafter. Finally, the checksum stored and the currently calculated checksum (calculated by block 26) are compared with each other in a block 30. If any differences are established, it can be assumed that the input data has been corrupted during the execution of the calculation of the cryptographic algorithm, which in turn is an indication of an error attack. Therefore the output data is suppressed. If no difference in the checksums is established, it is assumed that no attack has taken place, so that the output data may be output or transferred as input data to a further cryptographic calculation.

An alternative embodiment of verifying a change in the input data of a calculation of a cryptographic algorithm will be represented below with reference to FIGS. 3a and 3b. Like in the embodiment shown in FIG. 2a, the input data is initially stored at an input data memory location (block 32). Unlike the embodiment shown in FIG. 2a, in which a checksum was calculated, the input data is now processed by means of a processing algorithm so as to obtain security information (block 34). Then the security information calculated by block 34 are then stored, in a block 36, at a security information memory location of the crypto-processor.

Verification is now performed as follows. As is shown in a block 38 of FIG. 3b, the information located at the security information memory location is initially retrieved. This information is then processed by means of a check algorithm in a block 40, the check algorithm being implemented such that it provides a predetermined result if the contents of the security information memory location are unchanged. In a block 42, a verification is carried out as to whether processing by the check algorithm in block 40 has led to the predetermined result. If this is the case, the output data is forwarded as is represented by a block 44. If it is established, however, that processing by the check algorithm 40 has not led to the predetermined result, the output data is suppressed (block 16).

A preferred embodiment for safely executing the RSA-CRT method will be described below with reference to FIG. 4, in which method the inventive concept of verifying the input data prior to outputting output data of a cryptographic algorithm is employed at several locations within the algorithm.

Figure 4:
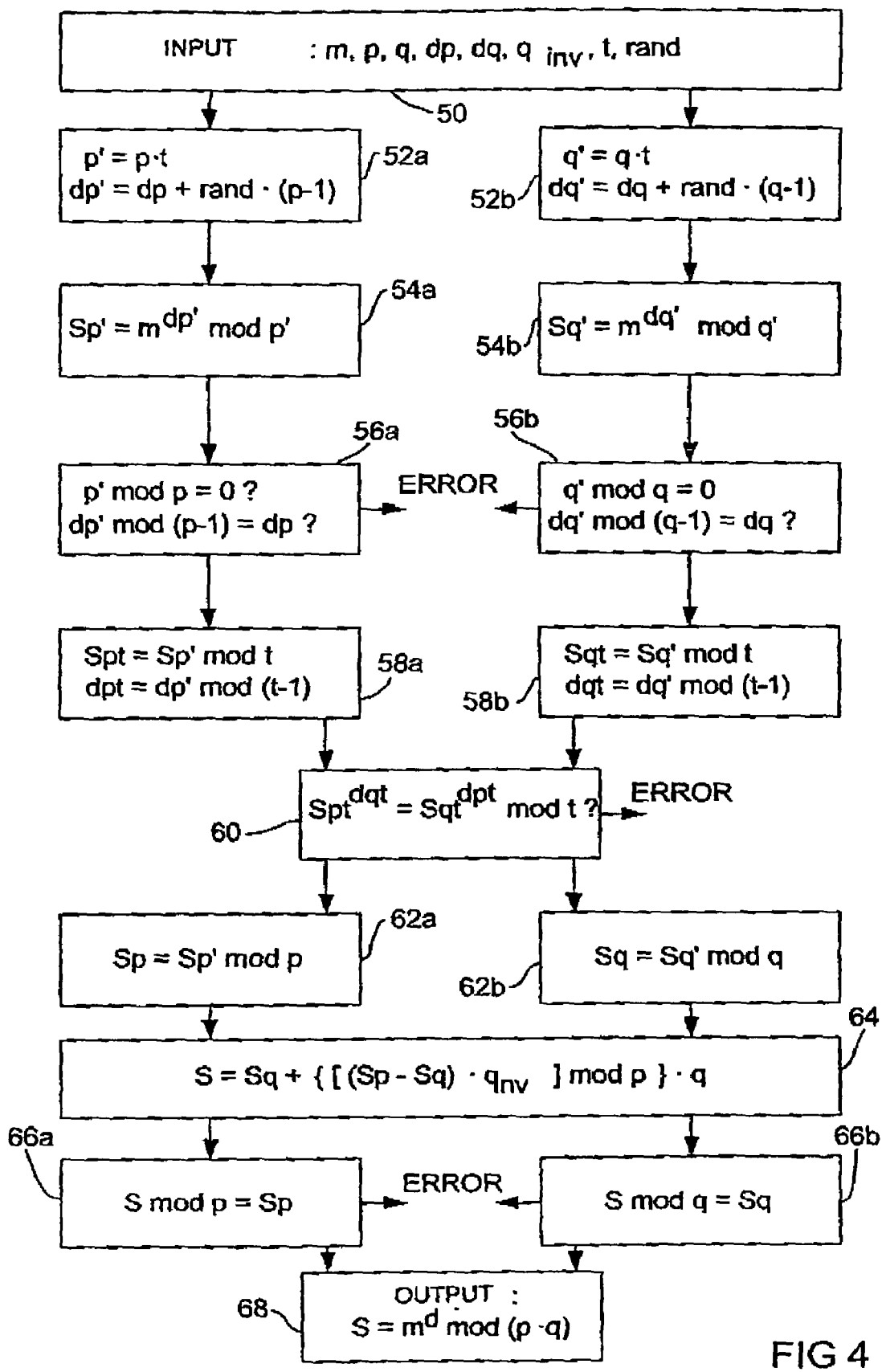
FIG. 4 show a detailed representation of the inventive concept using the RSA-CRT method.

In addition, the calculation of the cryptographic algorithm itself, in particular the calculation of the two auxiliary exponentiations, is also verified in the embodiment shown in FIG. 4. Finally, in the embodiment shown in FIG. 4, a verification is also carried out as to whether the "joining" of the two results of the auxiliary exponentiations, so as to obtain the signed message s, has taken place in the correct manner.

As was already represented by means of FIG. 5, the parameters p, q, dp, dq, qinv, which are the usual input parameters for the RSA-CRT method, are initially provided. As is represented in a block 50 of FIG. 4, the message m to be encrypted as well as a number t and a random number rand are further provided as input data. The number t is preferably a prime number, and preferably a small prime number which is, for example, no longer than 16 bits, so as not to impair the advantage of the CRT method too much, namely that the two auxiliary exponentiations are performed with a smaller module as compared to a single modular exponentiation with the module n=p times q. If the number t is no prime number, this case is also possible, however the expression (t-1) would have to be replaced by the Euler Phi function of t in the equations.

Figure 3A:
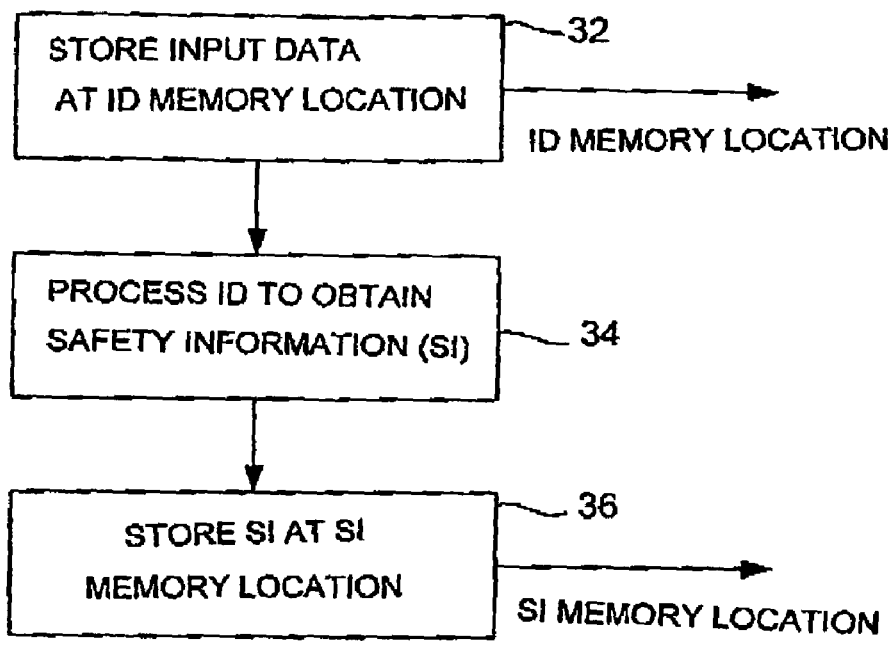
FIGS. 3a and 3b show a more detailed representation of the inventive concept using a second embodiment of the present invention.
Figure 3B:
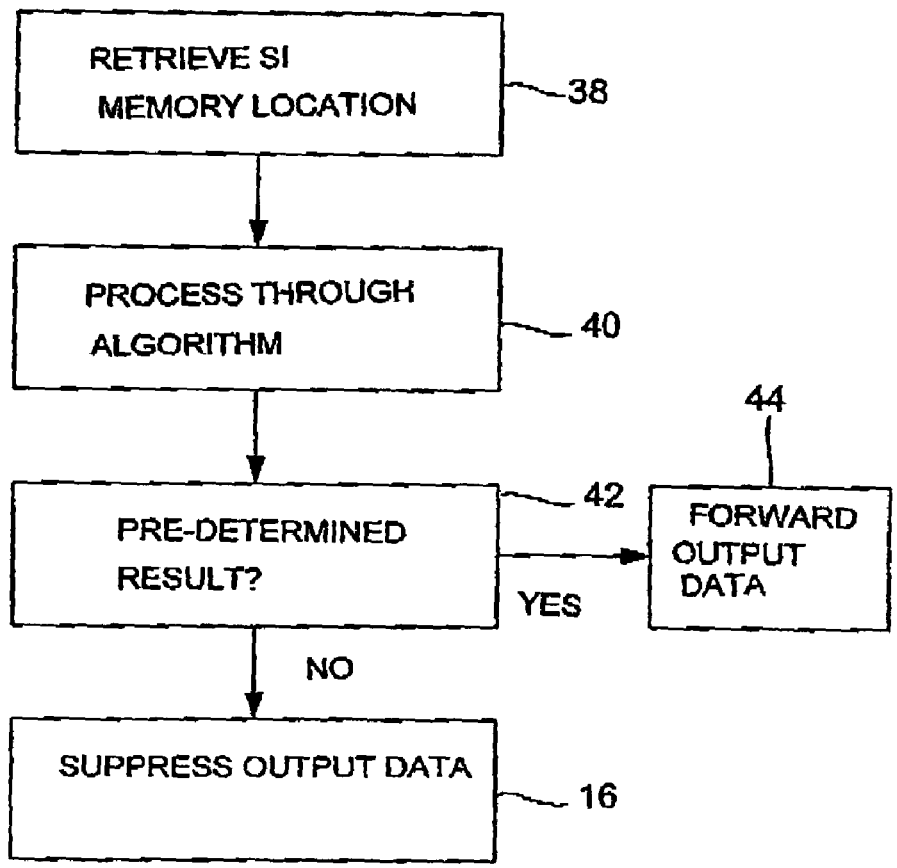

As is represented by FIG. 3a, input data is initially processed in blocks 52a, 52b. The multiplication of the original parameter p and/or q with the prime number t is used as the processing algorithm. Further, the addition of dp with the product of the random number rand and the number (p-1) and/or accordingly for q, is used as the processing specification.

It shall be pointed out that a single one of the four processing specifications given in blocks 52a, 52b would, in principle, lead to an inventive effect. After blocks 52a, 52b have been completed, the security information p', dp', q' and dq' obtained by the processing are stored at a security information memory location. This memory location could be, for example, the working memory of a crypto-processor, or an internal register associated with the calculating unit of the crypto-processor. Subsequently, as is represented by blocks 54a, 54b, both the first auxiliary exponentiation (sp') and the second auxiliary exponentiation (sq') are carried out, by the calculating unit, as the calculation within the cryptographic algorithm, as is shown in FIG. 4. After performing blocks 54a, 54b, the output data of the calculations, namely sp' and sq', are not either directly output and/or directly forwarded for a further calculation, but a verification is carried out in accordance with the invention, initially in blocks 56a, 56b by means of a check algorithm, as to whether the input data for the calculation in blocks 54a, 54b have been changed by blocks 54a, 54b during the calculation. To this end, a modular reduction is used as the check algorithm, wherein either 0 is expected as the predetermined result, as is represented in the first lines of both blocks 56a, 56b, or either dp or dq is expected as the predetermined result. The predetermined result comes about if the variable p', which in the terminology of the present invention is the security information, has not been changed, for example due to an error attack. The same applies to the further security information dp'.

If the verifications in blocks 56a, 56b are successful, i.e. if predetermined results are obtained by means of the check algorithm, the process proceeds to blocks 58a, 58b. Blocks 58a, 58b show preferred pre-calculations so as to perform, in addition to the input data verification concept, a result data verification concept. By means of a result check algorithm (block 60 in FIG. 4), a verification is then performed as to whether the calculation of the auxiliary exponentiations in blocks 54a, 54b has been performed correctly.

In blocks 62a, 62b the auxiliary exponentiations of blocks 54a, 54b are subjected to a corresponding modular reduction to eliminate the influence of the parameter t and/or of the random number. As has been clarified by means of block 108 of FIG. 5, the joining step is finally carried out in a block 64 so as to produce the signed message s from the auxiliary exponentiation results sp, sq.

In a preferred embodiment of the present invention, however, this result is not directly used, but a verification as to whether the joining has been successful is carried out after the joining in block 64.

This is achieved by initially subjecting the obtained signed message s to a modular reduction using the prime number p as the module. This check algorithm should yield sp as a result, this sp having to be equal to the value sp calculated in block 62a.

An analogous approach is adopted in a block 66b so as to verify the correctness of the result s also by means of a modular reduction with the prime number q as the module. To this end, the intermediate memory location at which the result of block 64 was stored is initially accessed for executing the calculation given in block 66a. In addition, the memory location at which the input data p is stored is accessed. Finally, the memory location at which the result of block 62a, i.e. sp, is stored, is accessed so as to perform a comparison of block 66a. An analogous procedure is adopted in block 66b for s, q and sq.

If the calculation in block 66a provides a predetermined result to the effect that the left and right sides of the equation given in block 66a are not the same, an error is output, and the output of the result s of block 64 is suppressed. The same suppression of the result s takes place if the calculation in block 66b yields that an error has occurred. Thus, a suppression preferably takes place already if a single block has yielded an error, or, in other words, a result is output by means of a block 68 only if both the calculation in block 66a and the calculation in block 66b were correct.

It becomes evident in the example in block 66a that this result check algorithm is advantageous in that it directly uses the result of block 64 for verification, that it also accesses, however, the input data memory area to obtain the prime number p and/or the contents of the memory location at which p should be located, and that additionally an intermediate result, i.e. sp, is used which has been obtained in step 62a. Thus a verification is performed, by means of a calculation, as to whether any input data has changed, and a verification is performed as to whether the joining step 64 of the RSA-CRT method has been carried out correctly by the crypto-computational unit. Finally, an intermediate result sp is also used so that intermediate result registers are also included in a single simple calculation.

It becomes evident from the embodiment shown in FIG. 4 that both the processing algorithm for creating the security information and the check algorithm for verifying the input data are simple algorithms which are anyhow present in a crypto-computational unit, such as a multiplication algorithm or an algorithm for performing a modular reduction. The same applies to the processing algorithms in blocks 62a, 62b which are also based on a modular reduction, and to the check algorithm in blocks 66a, 66b which in turn is based on a modular reduction.

Even though in the preceding embodiment shown in FIG. 4 the multiplication of a number with a constant has been represented as the processing algorithm, and the modular reduction of the multiplication result with the original number has been represented as the check algorithm corresponding to this processing algorithm, it is evident for those skilled in the art that a number of processing algorithms and check algorithms corresponding to one other exist which make it possible to verify whether input data was changed, for example due to error attacks, during the performance of a calculation in a cryptographic algorithm.

In addition, it becomes evident from FIG. 4 that the processing algorithms, just like the check algorithms, may be implemented in a very simple manner and do not require any additional parameters other than the parameters that are present anyhow. In particular, it is preferred, in accordance with the invention, not to calculate any additional parameters, such as, for example, the public key e, in an expensive manner and then use it for a "counter-calculation" but to link as many input data, intermediate result data etc. as possible with each other, since in doing so potential errors in the working memory, in the internal registers or in the computational unit itself may be detected by means of a single verification step so as to suppress a data output in the event of an error so that no secret information may be determined from an incorrect output.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for protecting a calculation in a cryptographic algorithm against an error attack on a crypto-processor performing the cryptographic algorithm, the calculation obtaining input data to produce output data, the method comprising:
   providing the input data for the calculation at an input data memory location;
   performing the calculation using the provided input data by the crypto-processor to obtain the output data of the calculation;
   after the performance of the calculation in the crypto-processor, accessing the input data memory location in order to obtain contents of the input data memory location, verifying using the contents of the input data memory location whether the input data was changed during the calculation by using a verification algorithm which differs from the calculation; and
   if the verification proves that the input data at the input data memory location were changed during the calculation by the crypto-processor, suppressing a forwarding of the output data of the calculation.

2. The method as claimed in claim 1, wherein in the step of providing the input data, the input data is stored at the input data memory location;
   wherein further a checksum on at least part of the input data is formed and stored at a checksum memory location;
   wherein the verification algorithm comprises the following sub-steps:
      retrieving contents of the input data memory location;
      forming a checksum on at least part of the contents retrieved;
      retrieving of contents of the checksum memory location; and
      comparing the checksum formed with the retrieved contents of the checksum memory location; and
   wherein the forwarding of the output data is suppressed if the comparison shows a deviation.

3. The method as claimed in claim 1,
   wherein in the provision step the input data is stored at the input data memory location;
   wherein at least part of the input data is processed in accordance with a processing algorithm to obtain security information, the security information being stored at a security information memory location;
   wherein the verification algorithm comprises:
      retrieving at least part of the contents of the security information memory location; and
      processing of the contents of the security information memory location by means of a check algorithm, the check algorithm being designed such that it provides a predetermined result if the contents of the security information memory location is unchanged; and wherein the forwarding of the output data is suppressed if the check algorithm provides a result which deviates from the predetermined result.

4. The method as claimed in claim 1, wherein the cryptographic algorithm includes a further calculation, and wherein the security information are made available as input data for the further calculation if the verification algorithm provides the predetermined result.

5. The method as claimed in claim 3, wherein the verification algorithm further comprises accessing the input data memory location to retrieve at least part of the contents of the input data memory location, and wherein the check algorithm is arranged to further use at least part of the contents of the input data memory location.

6. The method as claimed in claim 3, wherein the processing algorithm for creating the security information includes multiplying an input quantity, which represents part of the input data, with an integer;

wherein the check algorithm includes a modular reduction of the contents of the security information memory location with the input quantity as the module; and wherein the predetermined result is "0".

7. The method as claimed in claim 3, wherein the processing algorithm includes summing a first input quantity and a product of a random number and of a second input quantity minus 1;

wherein the check algorithm includes a modular reduction of the contents of the security information memory location with the second input quantity minus 1 as the module;

wherein the predetermined result is the first input quantity.

8. The method as claimed in claim 1, wherein the cryptographic algorithm is a modular exponentiation for the RSA algorithm with the Chinese remainder theorem (CRT).

9. The method as claimed in claim 8, wherein m, p, q, dp, dq, qinv, t and rand are provided as the input data, wherein m is a plain-text message to be processed, wherein p and q represent first and second prime numbers, the product of which is equal to a module n, wherein dp is a first auxiliary exponent, wherein dq is a second auxiliary exponent, wherein qinv equals q−1 mod p, wherein t is a prime number, and wherein rand is a random number.

10. The method as claimed in claim 9, wherein the processing algorithm is implemented as follows:

$p' = p \cdot t;$ $dp' = dp + \text{rand} \cdot (p-1);$ $q' = q \cdot t;$ and/or $dq' = dq + \text{rand} \cdot (q-1),$ and wherein the check algorithm is implemented as follows:

$p' \bmod p = 0;$ $q' \bmod q = 0;$ $dp' \bmod (p-1) = dp;$ and/or $dq' \bmod (q-1) = dq;$ and wherein the cryptographic calculation is as follows:

$sp' = m^{dp'} \bmod p';$ or $sq' = m^{dq'} \bmod q';$ wherein p', q', dp', dq' are security information, wherein dp, dq and 0 are predetermined results, and wherein sp', sq' are output data of the calculation of the cryptographic algorithm.

11. The method as claimed in claim 1, further comprising:

performing a result check algorithm with a result of the calculation of the cryptographic algorithm and with contents of the input data memory location, the result check algorithm differing from the calculation and providing a predetermined result if the input data memory location comprises unchanged contents and if the cryptographic calculation has been performed correctly; and suppressing the forwarding if the result check algorithm provides a result which deviates from the predetermined result.

12. The method as claimed in claim 11, wherein the calculation is as follows:

$sp' = m^{dp'} \bmod p';$ and/or $sq' = m^{dq'} \bmod q';$ wherein the result check algorithm is as follows:

$spt = sp' \bmod t;$ $sqt = sq' \bmod t;$ $dpt = dp' \bmod (t-1);$ $dqt = dq' \bmod (t-1);$ $spt^{dqt} = sqt^{dpt} \bmod t;$ and wherein the predetermined result is an equality.

13. The method as claimed in claim 11, wherein the cryptographic algorithm comprises a modular exponentiation for the RSA algorithm with the Chinese remainder theorem (CRT), wherein the calculation is given as follows:

$s = sq + \{[(sp-sq) \cdot qinv] \bmod p\} \cdot q;$ and wherein the result check algorithm is as follows:

$s \bmod p = sp;$ and/or $s \bmod q = sq,$ wherein the predetermined result is an equality condition.

* * * * *